(12) United States Patent
Kim et al.

(10) Patent No.: US 7,512,958 B2
(45) Date of Patent: Mar. 31, 2009

(54) HOLDER FOR DISK DRIVES

(75) Inventors: Tae Heon Kim, Kyungki-do (KR); Jun Kun Choi, Kyungki-do (KR); Nam Seok Kim, Kyungki-do (KR); Joon Ho Kim, Kyungki-do (KR); Chil Sung Lee, Kyungki-do (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 447 days.

(21) Appl. No.: 11/231,935

(22) Filed: Sep. 22, 2005

(65) Prior Publication Data

US 2006/0015886 A1    Jan. 19, 2006

Related U.S. Application Data

(62) Division of application No. 10/464,456, filed on Jun. 19, 2003, now abandoned.

(30) Foreign Application Priority Data

Apr. 28, 2003    (KR) .................... 10-2003-0026770

(51) Int. Cl.
*G11B 17/028* (2006.01)
(52) U.S. Cl. .................................... 720/715
(58) Field of Classification Search ............... 720/715, 720/707; 360/98.08, 99.05, 99.12; 310/67 R
See application file for complete search history.

(56) References Cited

U.S. PATENT DOCUMENTS

| 5,486,962 | A | 1/1996 | Boutaghou |
| 6,556,376 | B1 | 4/2003 | Boutaghou |
| 6,757,238 | B2 | 6/2004 | Higuchi |
| 6,868,549 | B2 | 3/2005 | Watanabe et al. |
| 7,209,320 | B1* | 4/2007 | Woods et al. ............ 360/99.12 |
| 2006/0031867 | A1* | 2/2006 | Ikemoto ................... 720/707 |
| 2006/0048176 | A1* | 3/2006 | Choi et al. ................ 720/707 |
| 2006/0206909 | A1* | 9/2006 | Kuse et al. ............... 720/707 |

(Continued)

FOREIGN PATENT DOCUMENTS

CN    1185624    6/1998

(Continued)

OTHER PUBLICATIONS

Abstract—Japanese Patent No. JP11120652, Published Apr. 30, 1999.

*Primary Examiner*—Tianjie Chen
(74) *Attorney, Agent, or Firm*—Lowe Hauptman Ham & Berner (57) ABSTRACT

The invention relates to an optical disk drive, and more particularly, to a holder for disk drives having an improved chuck structure for seating a disk. The holder of the invention, in use, is inserted into a central opening of a disk for detachably seating the disk, and comprises: a circular hub projected upward and sized equal to the central opening of the disk; a chuck projected from a lateral portion of the hub, wherein the chuck includes a rear portion elastically connected with the hub, a peak formed in a front portion of the chuck and a lower circular face of a curvature extended downward from the peak; and a support formed integral with the hub for contacting the lower circular face of the chuck to enable circular motion of the chuck.

6 Claims, 8 Drawing Sheets

U.S. PATENT DOCUMENTS

2007/0200465 A1* 8/2007 Shiga .................. 310/67 R
2007/0300247 A1* 12/2007 Kim et al. ............... 720/707
2008/0030109 A1* 2/2008 Takaki et al. ........... 310/67 R
2008/0046906 A1* 2/2008 Takaki et al. ............ 720/707

FOREIGN PATENT DOCUMENTS

| | | |
|---|---|---|
| JP | 08-339596 | 12/1996 |
| JP | 2000-067497 | 3/2000 |
| JP | 2000-149363 | 5/2000 |
| JP | 2000132893 A * | 5/2000 |
| JP | 2003-311409 | 11/2000 |
| JP | 2001-101738 | 4/2001 |
| JP | 2002-260313 | 9/2002 |
| JP | 2003-59144 | 2/2003 |

\* cited by examiner

HOLDER FOR DISK DRIVES

RELATED APPLICATIONS

The present application is a divisional application of U.S. patent application Ser. No. 10/464,456, filed Jun. 19, 2003.

BACKGROUND OF THE INVENTION

1. Field of the Invention

The invention relates to an optical disk drive, and more particularly, to a holder for disk drives having an improved chuck structure for seating a disk.

2. Description of the Related Art

Optical disk drives, in particular, slim optical disk drives include a CD-ROM drive, a DVD-ROM drive, a CD R/W drive and so on. Such an optical disk drive receives a disk to write or read records into/from the disk while turning the disk. A slim optical disk drive is particularly mounted on a slim computer such as a notebook computer.

The slim optical disk drive is limited in height. That is, since the slim optical disk drive is mounted on a thin main body, the height of the disk drive itself is limited. Therefore, the slim optical disk drive requires a holder structure for grasping a disk unlike a disk drive mounted on a typical desktop computer.

Figure 1:
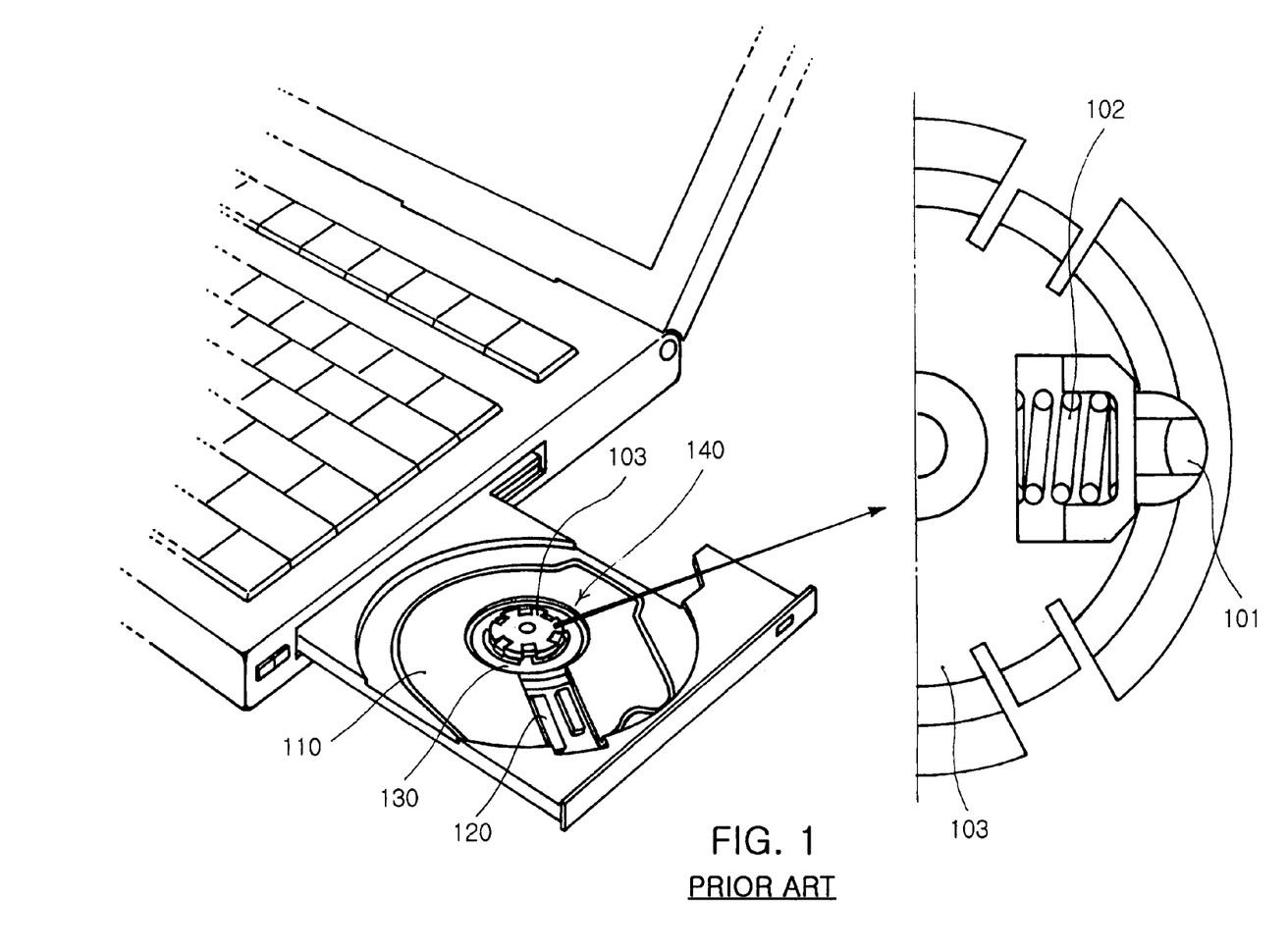
FIG. 1 is plan view of a conventional holder for disk drives.

FIG. 1 shows a conventional holder structure. As shown in FIG. 1, the conventional holder for disk drives comprises a flat cylindrical hub 103 sized equal to a central opening of a disk for being inserted into the central opening of disk and chucks 101 for elastically projecting from lateral regions of the hub 103 under the force of springs 102. The holder is placed in a central portion of a circular base 110, and a lower base 140 is provided with a stator assembly and a rotor assembly.

A rubber turntable 130 is provided around the holder for wrapping the holder therein so that the disk is seated or mounted on the turntable 130. The rotor and stator assemblies in the lower base 140 of the holder cooperate to turn the turntable 130 and the holder, and thus the disk grasped by the holder along with the turntable 130. As the disk is turned, writing or reading means write or read desired data into/from the disk while moving in a radial direction of the disk.

Figure 2:
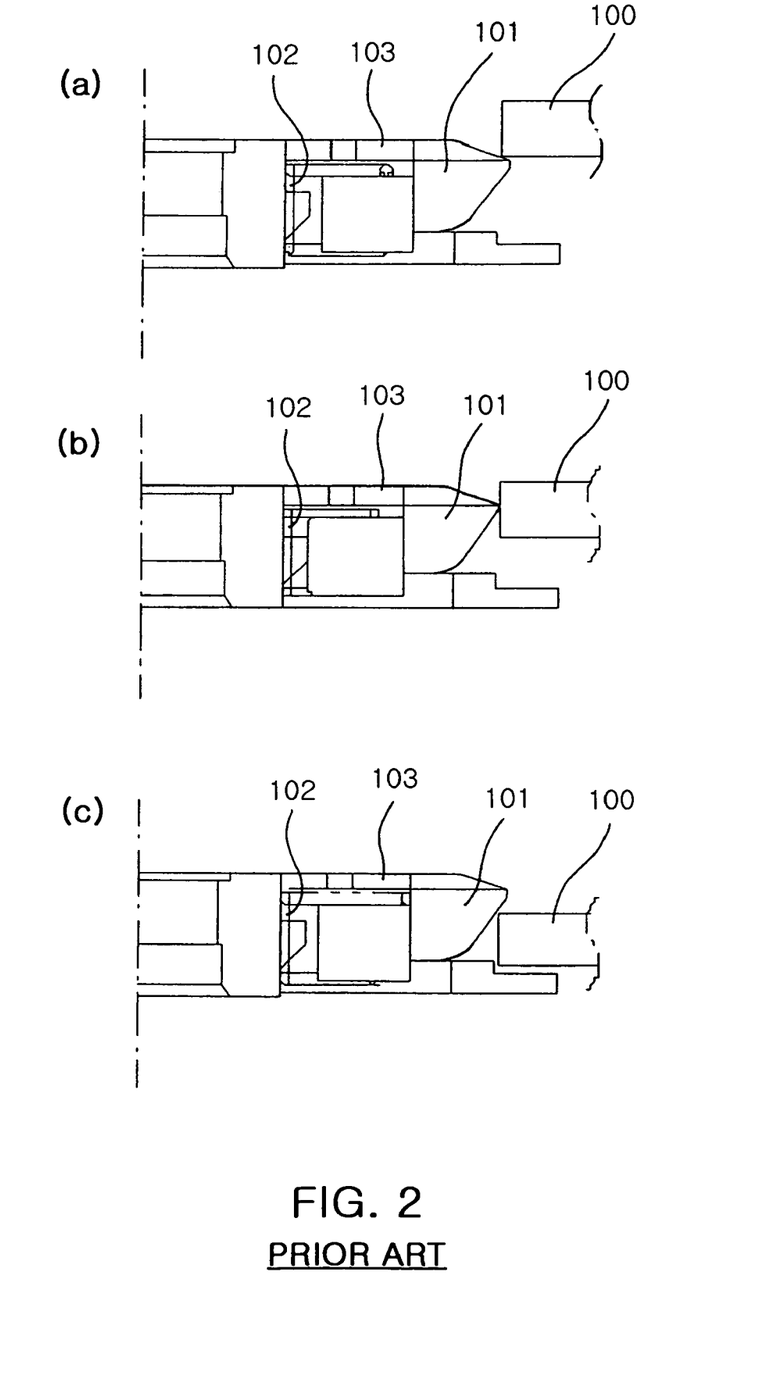
FIG. 2 illustrates a process of seating a disk on the conventional holder for disk drives.

Each of the chucks 101 used in the conventional holder grasps a disk according to a process shown in FIG. 2. FIG. 2(a) illustrates that the disk 100 contacts an upper portion of one of the chucks 101. As the user further moves the disk 100 downward, the chuck 101 is pushed backward slowly. As the disk 100 is further moved downward, the chuck 101 is pushed to the innermost position thereof in the holder hub 103 as shown in FIG. 2(b). When the disk 100 is completely seated on the turntable, the chuck 101 projects again toward the disk as shown in FIG. 2(c).

The chuck 101 has upper and lower faces, which taper at predetermined inclinations, and a peak portion at leading edges of the upper and lower faces. The chuck 101 functions to press the disk under a predetermined amount of force so that the disk may not slip upward out of the turntable while it is turning.

The disk holder structure using the above chucks has the following drawbacks. First, the central chucks are moved only in a horizontal direction, thereby enhancing seating force, i.e., force for seating the disk. The enhanced seating force causes inconvenience to the user in using the disk drive, and thus the user applies excessive force to the disk holder thereby potentially damaging the disk drive and even the main body.

If the tension of the springs which are mounted on rear of the chucks is adjusted to decrease the seating force, restraining force against separation or simply restraining force, i.e., force required for separating the disk or resisting against separation of the disk will be also reduced. Then, the disk may be separated even under slight impact during high speed rotation so that the disk drive may not properly perform its function. Therefore, the art requires a novel holder structure which can maintain sufficient amount of restraining force against separation while decreasing seating force.

As shown in FIG. 1, the peak of the chuck 101 has a semicircular configuration on a horizontal plane. In this configuration, the peak of the chuck 101 performs point-to-point contact with the periphery of the central opening of the disk, which does not increase the restraining force against separation of the disk. Further, in the case of a DVD for example having a double layer structure, an intermediate groove of the double layer structure may trap the chuck (i.e., half chucking) potentially causing problems to the seating process of the disk.

Therefore, the art also requires a structure capable of preventing half chucking in which the chuck is trapped by an intermediate portion of the disk while increasing the restraining force against separation.

SUMMARY OF THE INVENTION

The present invention has been made to solve the foregoing problems, and it is therefore an object of the present invention to provide a holder for disk drives having an improved structure of chucks and chuck supporting portions so that the chucks can perform downward circular motion along circular paths so as to reduce disk-seating force while enhancing restraining force against separation of a disk.

It is another object of the invention to provide a disk holder having an improved configuration of a peak portion of a chuck in order to prevent half chucking by the disk while enhancing restraining force against separation of the seated disk.

According to an aspect of the invention, there is provided a holder for disk drives which is inserted into a central opening of a disk for detachably seating the disk. The holder of the invention comprises: a circular hub projected upward and sized equal to the central opening of the disk; a chuck projected from a lateral portion of the hub, wherein the chuck includes a rear portion elastically connected with the hub, a peak formed in a front portion of the chuck and a lower circular face of a curvature extended downward from the peak; and a support formed integral with the hub for contacting the lower circular face of the chuck to enable circular motion of the chuck.

In the holder for disk drives, a contact face of the support contacting the lower circular face of the chuck is preferably an inclination sloped at a predetermined angle in respect to a horizontal plane, and the inclination more preferably has an inclination angle of about 5 to 25 degrees in respect to the horizontal plane.

Also in the holder for disk drives, a contact face of the support contacting the lower circular face of the chuck is an arc face, and the lower circular face of the chuck more preferably has a curvature radius smaller than that of the arc face of the support.

In addition, the holder of the invention may further comprise a guide provided in rear of the chuck, wherein the guide contacts the inside of the hub to restrict vertical circular motion of the chuck.

According to another aspect of the invention, there is provided a holder for disk drives which is inserted into a central opening of a disk for detachably seating the disk. The holder of the invention comprises: a circular hub projecting upward and sized equal to the central opening of the disk; a chuck projected from a lateral portion of the hub, wherein the chuck includes a rear portion elastically connected with the hub, a peak formed in a front portion of the chuck and a lower circular face of a curvature extended downward from the peak; and a support formed integral with the hub for contacting the lower circular face of the chuck to enable circular motion and linear motion of the chuck in sequence.

In the holder for disk drives, a contact face of the support contacting the lower circular face of the chuck preferably includes an inclined portion having a predetermined angle in respect to a horizontal plane and a horizontal portion connected with the inclined portion, and the inclined portion of the contact face more preferably has an inclination angle of about 5 to 25 degrees. Also, a contact face of the support contacting the lower circular face of the chuck includes an arc face and a horizontal face connected with the arc face, and the lower circular face of the chuck more preferably has a curvature radius smaller than that of the arc face.

In addition, the holder of the invention may further comprise a guide provided in rear of the chuck, wherein the guide contacts the inside of the hub to restrict vertical circular motion of the chuck.

According to further another aspect of the invention, there is provided a holder for disk drives which is inserted into a central opening of a disk for detachably seating the disk. The holder of the invention comprises: a circular hub projected upward and sized equal to the central opening of the disk; a chuck projected from a lateral portion of the hub, wherein the chuck includes a rear portion elastically connected with the hub, a peak formed in a front portion of the chuck and having a curvature radius on a horizontal plane equal to a radius of the central opening and a lower circular face of a curvature extended downward from the peak; and a support formed integral with the hub for contacting the lower circular face of the chuck to enable circular motion of the chuck.

In the holder of the invention, a contact face of the support is preferably an inclination sloped at a predetermined angle in respect to the horizontal plane, the inclination more preferably has an inclination angle of about 5 to 25 degrees in respect to the horizontal plane. Further, a contact face of the support is preferably an arc face, and the lower circular face of the chuck more preferably has a curvature radius smaller than that of the arc face of the support. Also, the holder of the invention may further comprise a guide provided in rear of the chuck, wherein the guide contacts the inside of the hub to restrict vertical circular motion of the chuck.

According to yet another aspect of the invention, there is provided a holder for disk drives which is inserted into a central opening of a disk for detachably seating the disk. The holder of the invention comprises: a circular hub projected upward and sized equal to the central opening of the disk; a chuck projected from a lateral portion of the hub, wherein the chuck includes a rear portion elastically connected with the hub, a peak formed in a front portion of the chuck and having a curvature radius on a horizontal plane equal to a radius of the central opening and a lower circular face of a curvature extended downward from the peak; and a support formed integral with the hub for contacting the lower circular face of the chuck to enable circular motion and linear motion of the chuck in sequence.

In the holder of the invention, a contact face of the support preferably includes an inclined portion having a predetermined angle in respect to a horizontal plane and a horizontal portion connected with the inclined portion, and the inclined portion of the contact face more preferably has an inclination angle of about 5 to 25 degrees. Further, a contact face of the support contacting the lower circular face of the chuck preferably includes an arc face and a horizontal face connected with the arc face, and the lower circular face of the chuck more preferably has a curvature radius smaller than that of the arc face. In addition, the holder of the invention may further comprise a guide provided in rear of the chuck, wherein the guide contacts the inside of the hub to restrict vertical circular motion of the chuck.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 3:
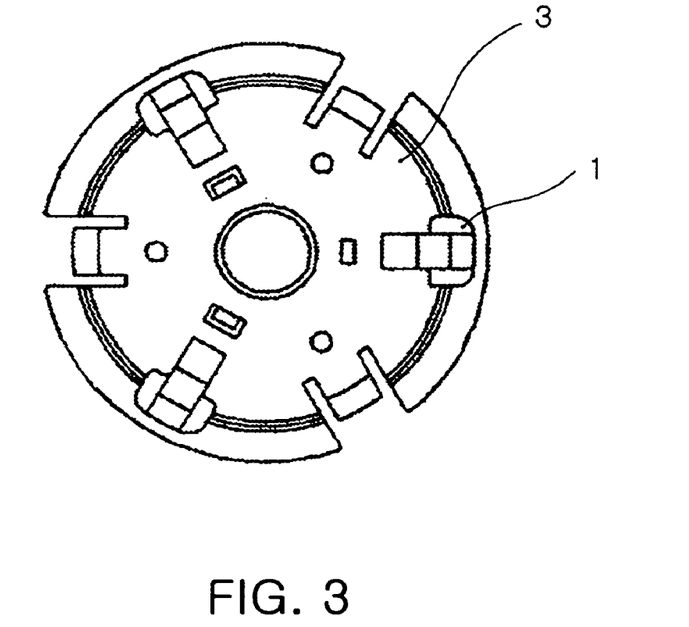
FIG. 3 is a plan view of a holder for disk drives of the invention.
Figure 4:
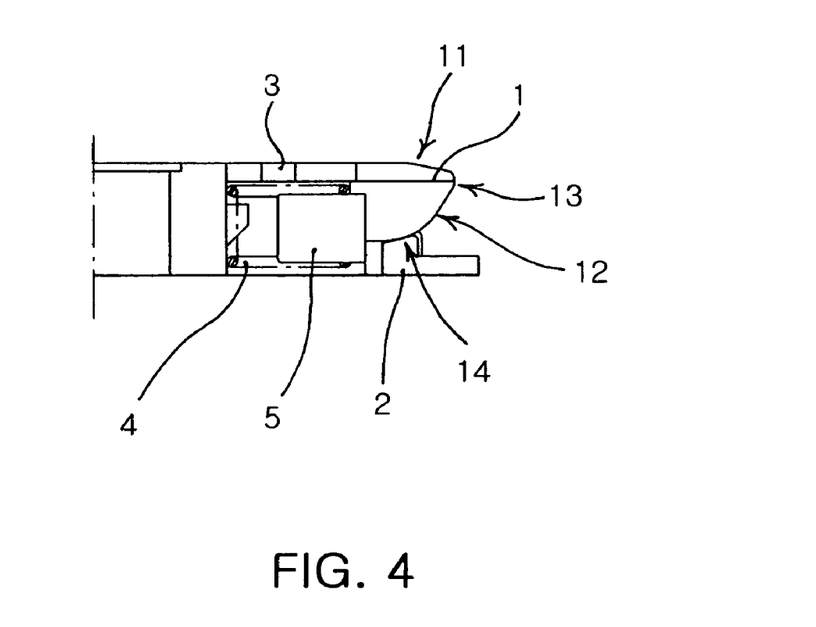
FIG. 4 is sectional view of a holder chuck in FIG. 3.

The following detailed description will present a preferred embodiment of the invention in reference to the accompanying drawings. FIG. 3 is a plan view of a holder for disk drives of the invention, and FIG. 4 is sectional view of a holder chuck in FIG. 3.

The disk holder of the invention comprises a hub 3, chucks 1 mounted on the hub 3 and supports 2 for supporting the chucks 1.

Holder Structure

The hub 3 has a generally circular sectional configuration, as shown in FIG. 3, to match an opening of a predetermined diameter formed in a central portion of a disk. The hub 3 is made of resin, and projected from an upper central portion of drive means including a stator assembly and a rotor assembly.

As shown in FIG. 4, each of the chucks 1 is mounted on the hub 3 so that the each chuck 1 can perform elastic motion in respect to the hub 3. The chuck 1 is elastically connected by its rear portion with the inside of the hub 3. That is, the rear portion of the chuck 1 is connected with the inside of the hub 3 via elastic means such as a spring so that the chuck 1 can perform elastic motion in respect to the hub 3.

The chuck 1 is projected from a lateral portion of the hub 3, and provided with a peak 13 projected from a front portion thereof. Upper and lower faces 11 and 12 formed in the chuck 1 are inclined upward and downward, respectively, from the peak 13 at predetermined angles so that the disk can be fixed in position by the peak structure.

A support 2 as shown in FIG. 4 is placed under the chuck 1. The support 2 allows the chuck 1 to perform downward or upward circular motion rather than horizontal motion. The support 2 is formed integral with the hub 3, and a contact face 14 in contact with the chuck 1 is formed at an angle inclined in respect to a horizontal plane.

The lower face 12 of the chuck 1 has a curved region of a predetermined curvature under the peak 13. The curved region of the lower face 12 slides on the contact face 14 of the support 2 so that the chuck 1 moves along a circular path.

Operation

Figure 5:
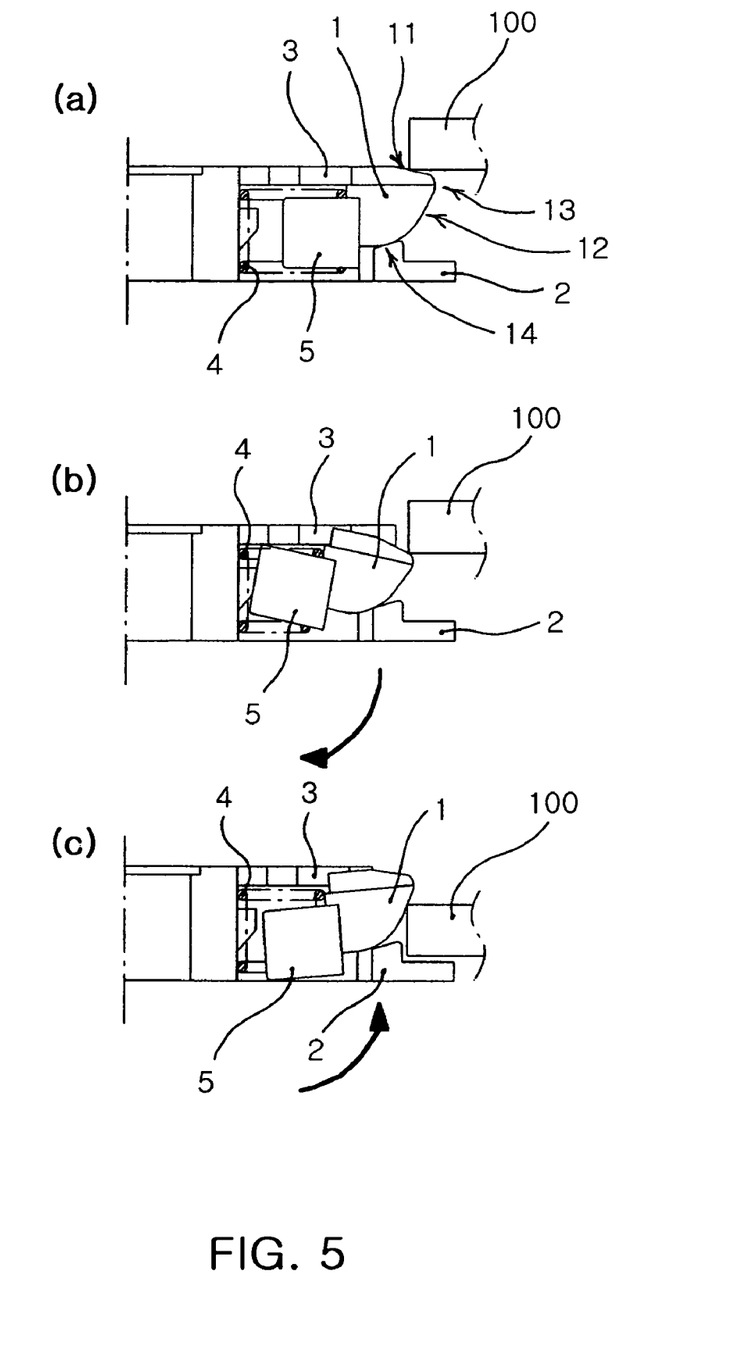
FIG. 5 illustrates motion of the holder chuck in a seating process of a disk performed by the holder for disk drives of the invention.

FIG. 5 illustrates motion of the holder chuck in a seating process of a disk performed by the holder for disk drives of the invention. FIG. 5(a) illustrates an initial stage of seating a disk 100 on the holder. In FIG. 5(a), the disk 100 primarily contacts the upper face 11 of the chuck 1, in which the upper face 11 of the chuck 1 is inclined at a predetermined angle so that the disk 100 slides down along the upper face 11.

Under the pressing force of the disk 100, the peak of the chuck 1 moves downward along the same path, that is, the curved region formed in the lower face of the chuck 1 as shown in FIG. 5(b). When the later portion of the disk 100 reaches beyond the peak of the chuck 1 as the disk 100 further moves downward, the peak of the chuck 1 returns over the disk, as shown in FIG. 5C, resulting from the elastic force of the spring.

Chuck Structure

Figure 6:
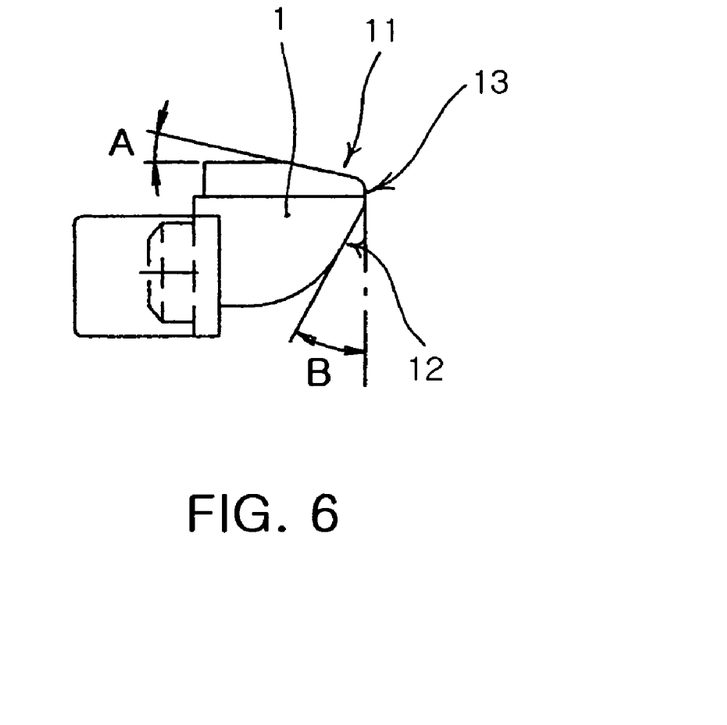
FIG. 6 is a sectional view illustrating an important part of the holder chuck of the holder for disk drives of the invention.
Figure 7:
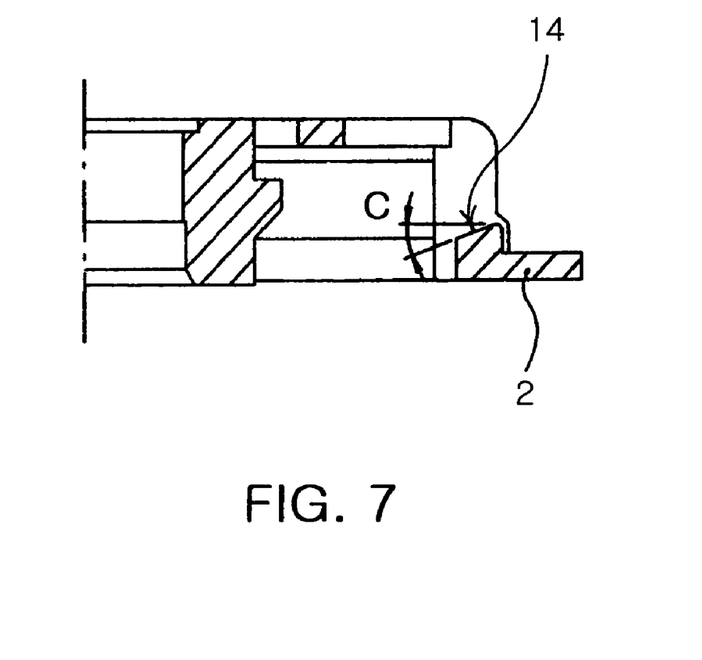
FIG. 7 is a sectional view of a support of the holder for disk drives of the invention.

The following will detail the structure of the chuck 1 and the support 2 having the above operation. FIG. 6 is a sectional view illustrating an important part of the holder chuck of the holder for disk drives of the invention, and FIG. 7 is a sectional view of the support of the holder for disk drives of the invention.

In order to perform the above operation as shown in FIG. 5, the lower face of the chuck 1 is curved to have a predetermined value of curvature, and the contact face of the support 2 in contact with the chuck 1 is also inclined at a predetermined angle. The curved lower face 12 of the chuck 1 cooperates with the inclined contact face 14 of the support 2 so that the chuck 1 can perform circular motion along the curved lower face 12.

Such circular motion functions to reduce the seating force applied to the disk and but to enhance the restraining force against separation of the disk after the disk is seated on the holder.

The contact face 14 of the support shown in FIG. 4 is in the form of an arc. That is, the contact face 14 of the support can be also arc-shaped so that the chuck of the invention can perform circular motion. Then, the arc is so formed that an imaginary straight line connecting between ends of the arc has a downward inclination angle in respect to a horizontal plane.

Further, the curvature radius of the arc forming the contact face 14 is preferably at least same as that of the curved lower face 12 of the chuck 1. If the curvature radius of the arc is smaller than that of the lower face of the chuck, contact between the chuck and the support is made according to a two-point support structure, which is too unstable to endure the seating force which is applied downward via the disk. Therefore, the curvature is determined so that the arc face and the lower face can perform face-contact or at least line-contact.

As shown in FIG. 6, the reference mark A indicates an inclination angle of the upper face 11 of the chuck 1, extended upward from the peak 13, in respect to an upper horizontal plane. The reference mark B indicates an angle of a lower face of the chuck 1, extended downward from the peak 13, in respect to a vertical plane. As shown in FIG. 7, the reference mark C indicates an angle of the contact face 14 of the support 2, which contacts the chuck 1, in respect to a horizontal plane. These angles are important factors related to the seating force applied to the holder chuck and the restraining force against separation (or detachment) of the disk from the chuck.

Experiments were performed varying the above three angles to compare seating forces and restraining forces of the holder of the invention with those of a conventional holder structure.

TABLE 1

| Group | Measuring Factors | | | Mounting Force | Restraining Force |
| --- | --- | --- | --- | --- | --- |
| | A(°) | B(°) | C(°) | gf | gf |
| 1 | 5 | 30 | 0 | 1400 | 330 |
| | 10 | 30 | 10 | 1000 | 370 |
| | 12 | 30 | 20 | 800 | 350 |
| | 12 | 30 | 25 | 700 | 400 |
| | 15 | 30 | 20 | 900 | 370 |
| | 15 | 30 | 25 | 900 | 370 |
| 2 | 5 | 35 | 0 | 1300 | 400 |
| | 10 | 35 | 10 | 1050 | 430 |
| | 12 | 35 | 20 | 950 | 450 |
| | 12 | 35 | 25 | 850 | 400 |
| | 15 | 35 | 20 | 700 | 330 |
| | 15 | 35 | 25 | 800 | 360 |
| 3 | 5 | 40 | 0 | 1250 | 450 |
| | 10 | 40 | 10 | 900 | 450 |
| | 12 | 40 | 20 | 1000 | 450 |
| | 12 | 40 | 25 | 900 | 350 |
| | 15 | 40 | 20 | 850 | 320 |
| | 15 | 40 | 25 | 820 | 360 |

In the above experiments, it is to be noted that first values in respective groups where C is 0 degrees indicate seating and restraining forces of the disk measured in the conventional holder structure. That is, the seating force is in a range of about 1400 to 1250 gf, and the restraining force is in a range of about 330 to 450 gf. The holder of the invention can seat the disk under the seating force which is smaller than that of the conventional holder as well as maintain the disk under the restraining force which is larger than that of the conventional holder.

Where B is 30 degrees, the conventional holder has the seating force of about 1400 gf and the restraining force of about 330 gf. If the contact face of the support of the chuck is formed as an inclined face as in the invention, however, the respective seating forces are smaller than those of the conventional holder, wherein C is in a range of about 10 to 25 degrees, B is about 30 degrees, and A is about 10 to 15 degrees. Where A is in a range of about 10 to 15 degrees, the respective seating forces are smaller that those of the conventional holder. In this case, the restraining forces are also smaller than those of the conventional holder.

Similarly, where B is about 35 degrees, the seating force of the conventional holder is about 1300 gf and the restraining force thereof is about 400 gf. Also in this case, the seating force is smaller than the conventional holder and the restraining force can maintain a sufficient value. This is same where B is about 40 degrees.

As can be seen in Table 1, where the contact face of the support is inclined, the seating force is reduced compared with that of the conventional holder while the restraining force against separation of the disk can maintain a sufficient value. From the above result, it is possible to determine the configuration of the holder so that the restraining force is larger than that of the conventional holder if the angles A and B are properly adjusted according to the angle C. Where C is about 20 degrees, A is about 12 degrees, and B is about 35 degrees, a result can be obtained that the seating force is about 950 gf and the restraining force is about 450 gf.

Figure 8:
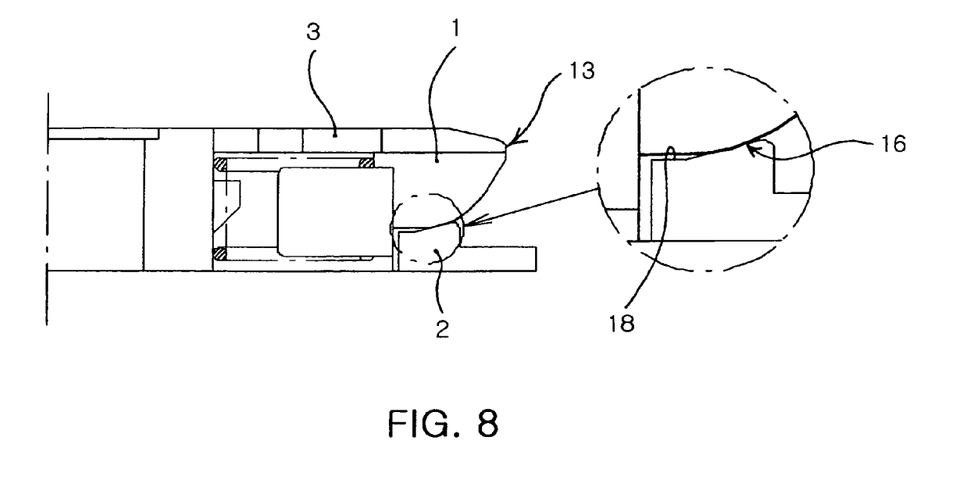
FIG. 8 is a sectional view of an alternative to the holder chuck of the holder for disk drives of the invention.

FIG. 8 is a sectional view of an alternative to the holder chuck of the holder for disk drives of the invention. As described above, the holder for disk drives of the invention comprises a support 2 for supporting a chuck 1 which is so constructed to have a face inclined in respect to a horizontal face. As shown in FIG. 8, the support 2 can have a contact face including an inclined face 16 and a horizontal face 18 connected with the inclined face 16.

According to the afore described contact face structure of the support, downward motion of a disk primarily causes the chuck 1 to perform circular motion, which is followed by downward movement of a peak 13 of the chuck 1. As directed downward, the peak 13 is moved horizontally backward along the horizontal face 18 of the support.

This structure further provides horizontal motion to afore described downward or upward circular motion, and advantageously increases the path of the chuck 1. The holder can be also designed so that the chuck can further project in a forward direction to increase the restraining force against separation of the disk.

Figure 9:
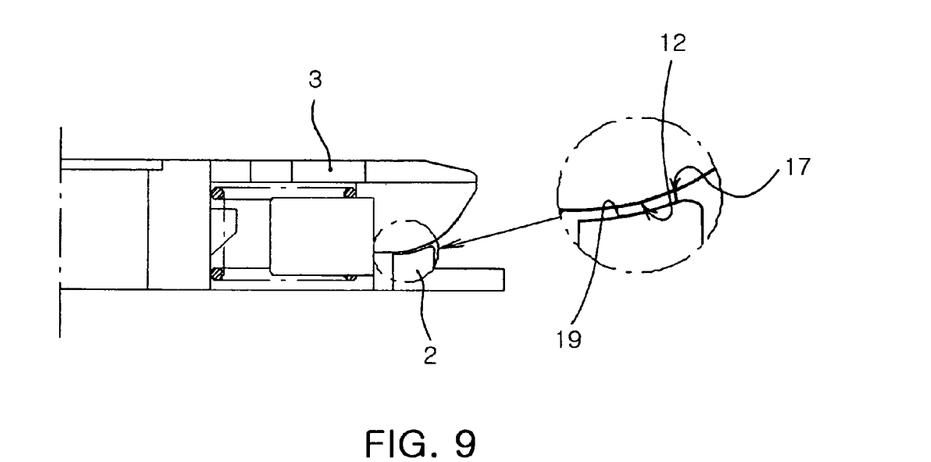
FIG. 9 is a sectional view of another alternative to the holder chuck of the holder for disk drives of the invention.

FIG. 9 is a sectional view of another alternative to the holder chuck of the holder for disk drives of the invention. As shown in FIG. 9, a support 2 includes an arc face 17 of a predetermined curvature and a horizontal face 19 connected with a rear portion of the arc face 17. With the support shown in FIG. 9, the chuck likewise performs circular motion along the arc face and then horizontal backward motion.

This structure also increases in effect the path of the chuck as well as enhances the restraining force of the disk as in FIG. 8. Further, this structure forms the arc face instead of the inclined face in FIG. 8 so that friction areas can be increased. As a result, abrasion of the chuck and/or support can be prevented.

The arc face 17 functions as a contact face of the support 2, and is so formed that an imaginary straight line connecting between ends of the arc has an angle inclined downward in respect to a horizontal plane. The curvature radius of the arc of the contact face 17 is at least same as that of a curved lower face 12 of the chuck 1, and preferably larger than that of the curved lower face 12 of the chuck 1. If the curvature radius of the arc is smaller than that of the lower face of the chuck, contact between the chuck and the support is made according to a two-point support structure, which is too unstable to endure the seating force which is applied downward via the disk. Therefore, the curvature is determined so that the arc face and the lower face can perform face-contact or at least line-contact.

Guide

Figure 10:
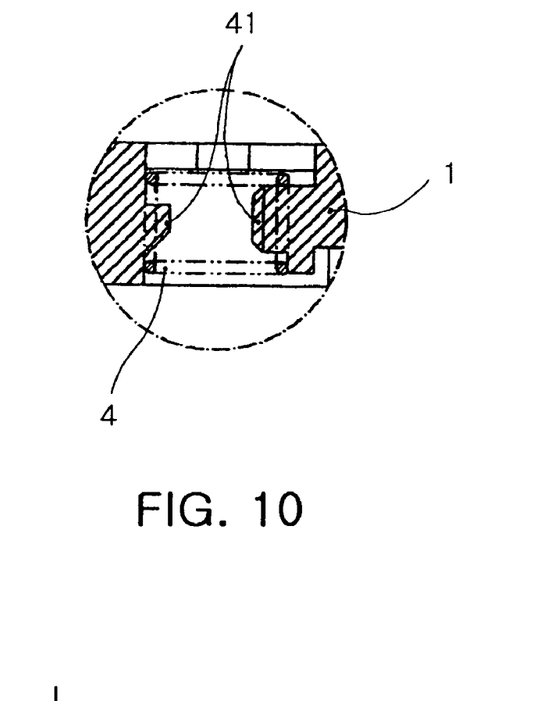
FIG. 10 is a sectional view illustrating elastic coupling of the chuck of the holder for disk drives of the invention.

FIG. 10 is a sectional view illustrating elastic coupling of the chuck of the holder for disk drives of the invention. In FIGS. 4 and 10, a guide 5 is provided in rear of the chuck 1. The guide 5 contacts the inside of the hub 3 to restrict vertical motion of the chuck 1. That is, if the chuck 4 moves downward in FIG. 4, an upper face of the guide 5 will contacts an inner upper face of the hub, thereby restricting downward motion of the chuck.

The guide is placed in rear of the chuck to prevent the chuck from performing circular motion to the extent that it cannot return to the original position. The guide also prevents the chuck from moving excessively upward to the extent that it separates from the hub during detachment of the disk.

Further, as shown in FIG. 10, a spring 4 is connected between a rear portion of the chuck 1 and the inside of the hub. In order to connect the spring with the rear portion of the chuck, spring guides 41 are projected from both of the rear portion of the chuck 1 and the inside of the hub.

Planar Configuration of Peak

Figure 11:
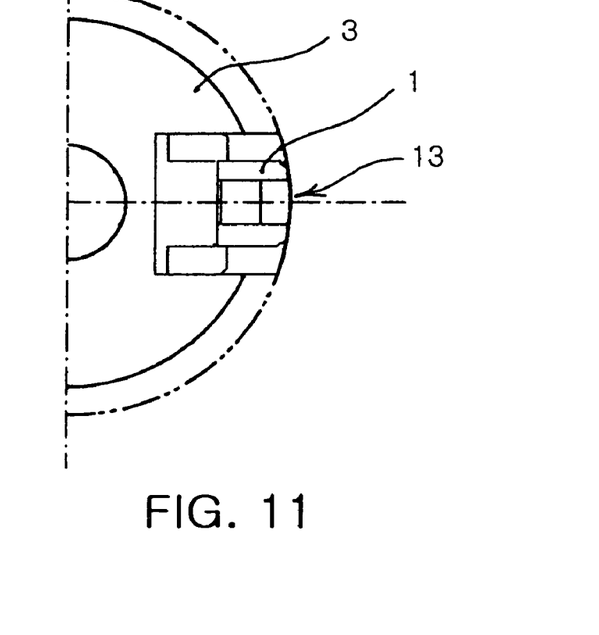
FIG. 11 is a plan view of a peak portion of the chuck of the holder for disk drives of the invention.

FIG. 11 is a plan view of a peak portion of the chuck of the holder for disk drives of the invention. The chuck 1 includes upper and lower faces, which are formed at predetermined inclination angles in a vertical cross section of the chuck 1, and a peak 13 formed at leading edges of the upper and lower faces. The lower face has a curved portion of a predetermined curvature.

The chuck has a planar configuration as shown in FIG. 11. That is, the peak 13 of the chuck 1 on a horizontal plane has a curvature radius same as the radius of a central opening of the disk. The curvature radius of the peak 13 is formed same as the radius of the disk opening to increase the contact area between the peak 13 and the disk. As the contact area between the disk and the chuck is increased, the disk is not readily separated from the holder after seated thereby.

As afore described, the planar configuration of the chuck has the curvature same as that of the central opening of the disk to provide a structure which can further enhance the restraining force against separation of the disk.

Prevention of Half Chucking

Figure 12:
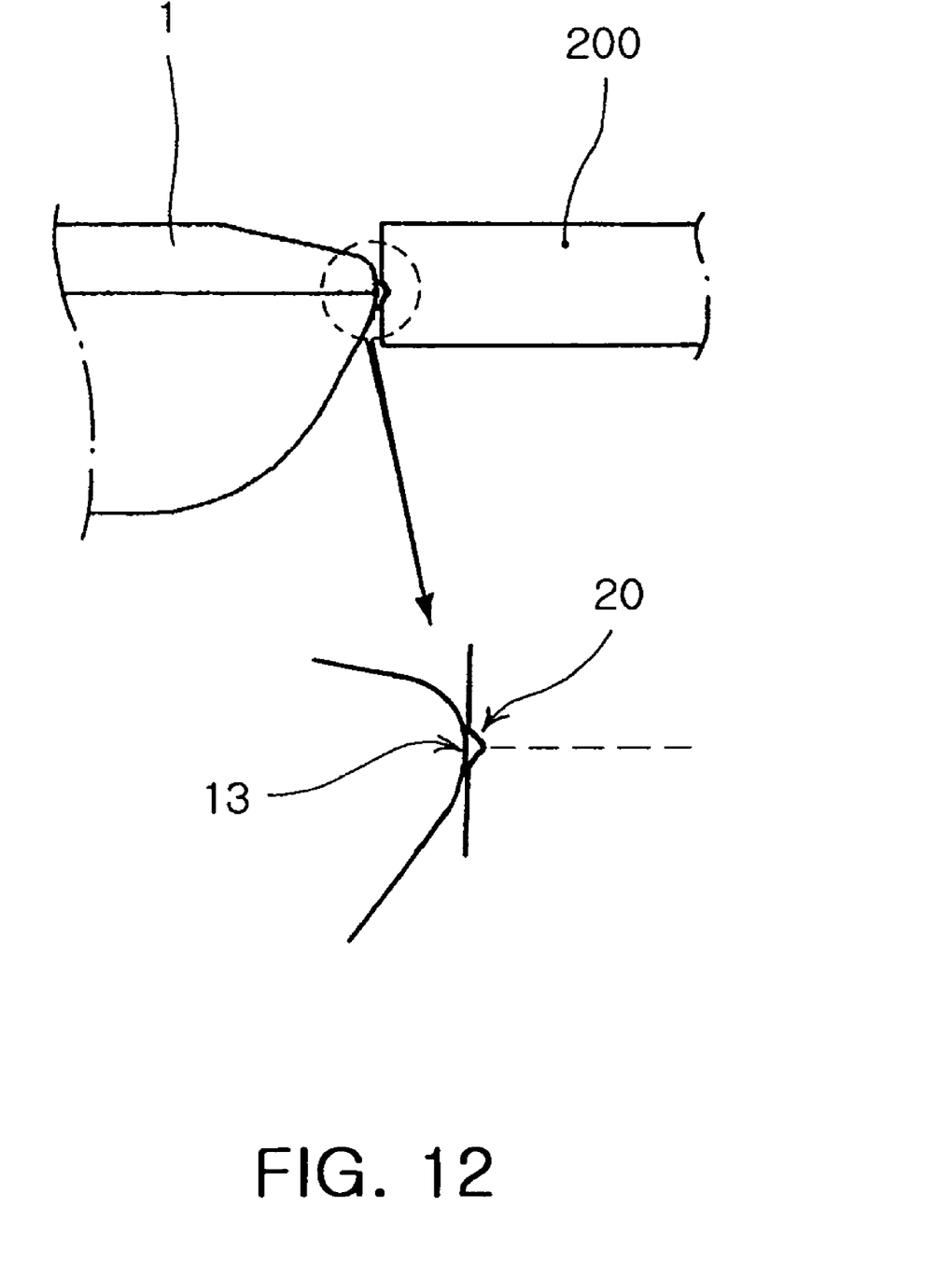
FIG. 12 illustrates the chuck of the holder for disk drives of the invention, which is trapped by an intermediate portion of a disk.

The afore described curvature structure of the chuck peak also functions to prevent half chucking in which the chuck is trapped by an intermediate portion of the disk. That is, in the event of seating a double-layer disk 200 such as a DVD disk having two plates stacked one on the other, the peak 13 of the chuck 1 may be trapped by a groove 20 which is formed along the periphery of the central opening of the disk 200 as shown in FIG. 12.

Because the conventional peak is rounded in the shape of a substantial semi-circle at a curvature radius smaller than the radius of the central opening of the disk, the chuck substantially performs a point contact. This causes the force for pushing the hub outward to concentrically act on the disk so that the peak of the chuck is trapped sometimes by the groove 20 of the disk.

Therefore, the invention provides the horizontal peak plane having a curvature radius same as the radius of the central opening of the disk to disperse elastic force acting on the peak. Further, the vertical cross section of the peak is rounded to have a curvature radius larger than that of the groove 20 of the disk 200. This configuration also functions to prevent half chucking in which the chuck is trapped by the groove of the disk.

The process of seating the disk on the holder has been described as above, whereas separation of the disk from the holder will follow a process reverse to the above seating process.

According to the present invention as set forth above, the support is provided with the inclined face or both the inclined face and the horizontal face so that the chuck performs downward circular motion along a circular path and both circular motion and linear motion in sequence along circular and linear paths so as to enhance the restraining force.

Further, the present invention improves the configuration of the peak portion in the chuck of the holder to enhance the restraining force while the disk is seated as well as to prevent half chucking in which the chuck is trapped by the intermediate portion of the disk.

While this invention has been described in connection with the preferred embodiments in the specification of the invention, it is also understood that various modifications and variations can be made without departing from the scope of the invention, which is not restricted to the above described embodiments but shall be defined by the appended claims and equivalents thereof.

What is claimed is:

1. A holder for disk drives which is inserted into a central opening of a disk for detachably seating the disk, the holder comprising:
   a circular hub projecting upward and sized equal to the central opening of the disk;
   a chuck projected from a lateral portion of the hub, wherein the chuck includes a rear portion elastically connected with the hub, a peak formed in a front portion of the chuck and a lower circular face of a curvature extended downward from the peak; and
   a support formed integral with the hub for contacting the lower circular face of the chuck to enable circular motion and linear motion of the chuck in sequence as the lower circular face of the chuck slides on a contact face of the support, wherein the contact face of the support contacting the lower circular face of the chuck includes an inclined contact portion having a predetermined angle in respect to a horizontal plane and a horizontal contact portion connected with the inclined portion.

2. The holder for disk drives as set forth in claim 1, wherein the inclined portion of the contact face has an inclination angle of about 5 to 25 degrees.

3. The holder for disk drives as set forth in claim 2, wherein the chuck includes a curvature of radius on a horizontal plane equal to a radius of the central opening.

4. The holder for disk drives as set forth in claim 1, further comprising a guide provided in rear of the chuck, the guide contacting the inside of the hub to restrict vertical circular motion of the chuck.

5. The holder for disk drives as set forth in claim 4, wherein the chuck includes a radius on a horizontal plane equal to a radius of the central opening.

6. The holder for disc drives as set forth in claim 1, a curvature radius on a horizontal plane equal to a radius of the central opening.

\* \* \* \* \*